(12) United States Patent
Takahashi

(10) Patent No.: US 6,176,052 B1
(45) Date of Patent: Jan. 23, 2001

(54) FIRE RETARDING DIVISION PENETRATING MEMBER

(75) Inventor: Jiro Takahashi, Kashiwa (JP)

(73) Assignee: Tosetz Co., Ltd. (JP)

( * ) Notice: Under 35 U.S.C. 154(b), the term of this patent shall be extended for 0 days.

(21) Appl. No.: 09/316,326

(22) Filed: May 21, 1999

(51) Int. Cl.$^7$ ...................................................... F16L 5/02
(52) U.S. Cl. ................... 52/232; 52/1; 52/220.8; 52/317; 52/DIG. 12; 137/75; 138/156; 138/166; 138/167; 285/64; 285/192
(58) Field of Search .................... 52/232, 317, 790.1, 52/1, 220.8, DIG. 12; 138/156, 166, 167, 128, 110; 137/75; 265/192, 19, 61–64, 20, 193, 194

(56) References Cited

U.S. PATENT DOCUMENTS

| | | | |
|---|---|---|---|
| 5,155,957 | * 10/1992 | Robertson et al. | 52/232 |
| 5,452,551 | * 9/1995 | Charland et al. | 52/232 |
| 5,456,050 | * 10/1995 | Ward | 52/220.8 |
| 5,876,042 | * 3/1999 | Graf et al. | 277/627 |
| 5,887,395 | * 3/1999 | Navarro et al. | 52/232 |
| 5,887,396 | * 3/1999 | Thoreson | 52/232 |
| 5,947,159 | * 9/1999 | Takahashi | 138/156 |
| 6,029,412 | * 2/2000 | Gohlke | 52/232 |

FOREIGN PATENT DOCUMENTS 9-280427  10/1997 (JP).

* cited by examiner

Primary Examiner—Christopher T. Kent
Assistant Examiner—Yvonne M. Horton
(74) Attorney, Agent, or Firm—McGlew and Tuttle, P.C.

(57) ABSTRACT

The installation of a fire retarding division-penetrating member is enhanced and the member fits the outer circumference of inconstant penetrating material to prevent the filler from dropping. The heat expansion fire resistant material may be securely provided. A tongue piece (17) of fire resistant material (16) may fit to the surface and valley of pipe (25) and cable (26) only by fitting the saw teeth state heat expansion fire resistant material (16) with its upper face being covered with the sheet (19) inside the holding frame (11) of sleeve main bodies (10) and (10a) that are split into two pieces and by dropping these sleeve main bodies (10) and (10a) into the floor through-hole (24) from above. In this way, the filler like mortar (28) and so forth can be immediately filled from the upper floor with no need for repairing the heat expansion fire resistant material (16). Further, the heat expansion fire resistant material (16) securely functions with the heat during a fire disaster, blocks the floor through-hole (24) and prevents the flames, heat, smoke, etc. from invading into the upper floor and the lower floor.

6 Claims, 6 Drawing Sheets

FIRE RETARDING DIVISION PENETRATING MEMBER

FIELD OF THE INVENTION

The present invention relates to a fire retarding division-penetrating member which is installed via the through-hole portions of piping and cables penetrating through the fire retarding division or floor slab of an apartment house, etc. and is for preventing the flames, heat, smoke and the like from invading into the adjacent rooms, upper floor (stories) and lower floors if a fire disaster should occur.

BACKGROUND OF THE INVENTION

For the purpose of preventing the spread of fire when a fire disaster has happened, fire retarding divisions (fire retarding walls) are installed in apartment houses, office buildings, school buildings, etc. Further, if the pipes and wires are to be laid out through this fire retarding division, it is necessary that the fire retarding kit, with the heat expansion fire resistant material, should be fitted into the through-holes for the purpose of preventing the flames, heat, smoke and so forth from invading into the adjacent rooms, upper floors (stories), lower floors, etc. via these penetrating portions.

A typical type of fire retarding kit that is generally utilized has a cylindrical shape or sleeve shape of a two piece split design. With such a kit with such a sleeve model, the installation work can be relatively easily done in the wall-penetrating portions. But with the floor slab penetrating portions, processes such as injecting the mortar, puttying, etc. are included, and hence the disposal needs to be done on both the lower floor side and upper flower side, thus requiring extensive work. Moreover, in case of the lower floor side, the work needs to be executed using ladders, stepladders, etc. Indeed, this can be problematic as the work entails dangers.

Therefore, such a fire retarding disposal kit is proposed as its work can be executed from the upper floor side alone, as shown at Item ① through Item ⑥ of FIG. 10. This fire retarding disposal kit is such a one as putting an adiabatic (heat-insulating) shielded copper pipe 2 into the center of floor through-hole 1 as shown at Item ①, dropping the two-split kit main bodies 3 and 3a into the hole 1 as shown in Item ②, cutting out the seal material 4 and burying the valley as shown in Item ③, rolling up the seal material 4 as shown in Item ④-1 and Item ④-2, then tightening the retainer metal fittings 5 and 5a with the bolt 6 and the nut 7 as shown in Item ⑤ and conducting the disposal as shown in Item ⑥.

However, in this installation example, the valleys are formed in the outer circumference of these penetrating substances if plural copper pipes 2 and cables should be penetrated as shown in the Item ③, and the depths of these valleys differ from each other, and hence work such as cutting out the seal material 4 to the proper size for burying it to the valley is needed, thus requiring added work.

Furthermore, because work such as rolling up on site the seal material 4 until it becomes the thickness of the inside diameter of retainer metal fittings 5 and 5a is also required as shown in Item ④-1 and Item ④-2, some trouble is involved in this work too.

For preventing the drop into the lower floor when such fillers as mortar and the like have been filled into the through holes from the story above the floor, the Japanese Unexamined Patent Publication No. H9-280427 describes a receptacle metal fitting. The metal fitting is structured in such a manner that a great number of support pieces 2 bending a thin plate approximately to a V-letter shape in its cross section, are laid out in sequence by use of the coupling pieces at more than 1 place formed on that lateral face and the receptacle is formed along the piping with this support piece 2, making it possible to fill the filler D into the hole from above.

However, in executing the work of installing this receptacle metal fitting, there is the need for bending the support piece 2 in line with the situation between the on-site piping and the hole and for adjusting its bending angle. One piece of pipe can be favorably adapted to the eccentric displacement with the hole, but a valley is formed among the pipes if there are more pipes than two. In many cases, this valley differs in its size, depth, shape, etc., the pipe cannot be appropriately adapted to these valleys even if the support piece 2 should be bent, and there is a fear that a gap is formed inside the support metal fitting 3 and that the filler may fall down to the lower floor. Also, there is the potential problem that the filler cannot sufficiently function any longer if the filler should be a heat expansion fire resistant material.

SUMMARY AND OBJECTS OF THE INVENTION

The present invention has been developed in consideration of the defects found in the publicly known embodiments and installation kits, and aims at providing a fire retarding division-penetrating member having such special features that the work execution is simple, the heat expansion fire resistant material can be surely fitted and the similar special features.

It is an object of the invention to provide a split sleeve main body which should be dropped down into the through-hole, and the filler such as the mortar, putty, etc. should be dropped into the sleeve main body from above, wherein this filler is received by the heat expansion fire resistant material and won't drop down to the lower floor.

Once a fire disaster should happen, in case of the shielded metallic pipes and cables the shielded material gets molten for its collapse, the metallic tube and the copper wire are left over and the resin pipe and sheath pipe get molten and entirely collapsed inside the through-hole, and under this situation, the heat expansion fire resistant material gets swollen to block the through-hole, thereby preventing the flames, heat, smoke, etc. from invading into the adjacent rooms, upper floor and lower floor areas.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1A:
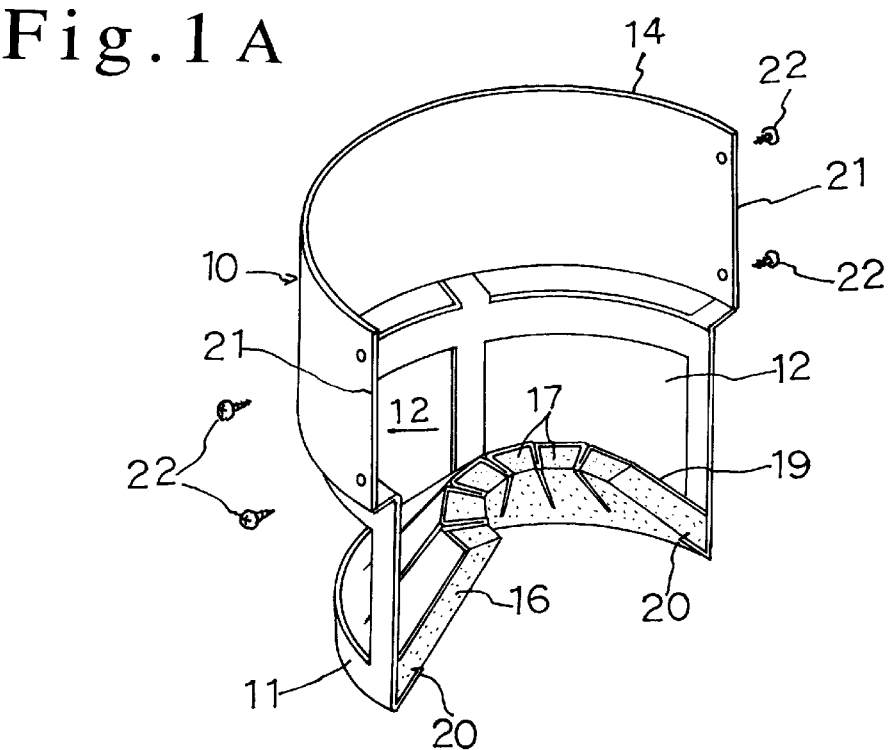
FIG. 1A is an explanatory view showing one piece of the penetrating member relating to this invention, in the state after having split the penetrating member into two pieces.
Figure 1B:
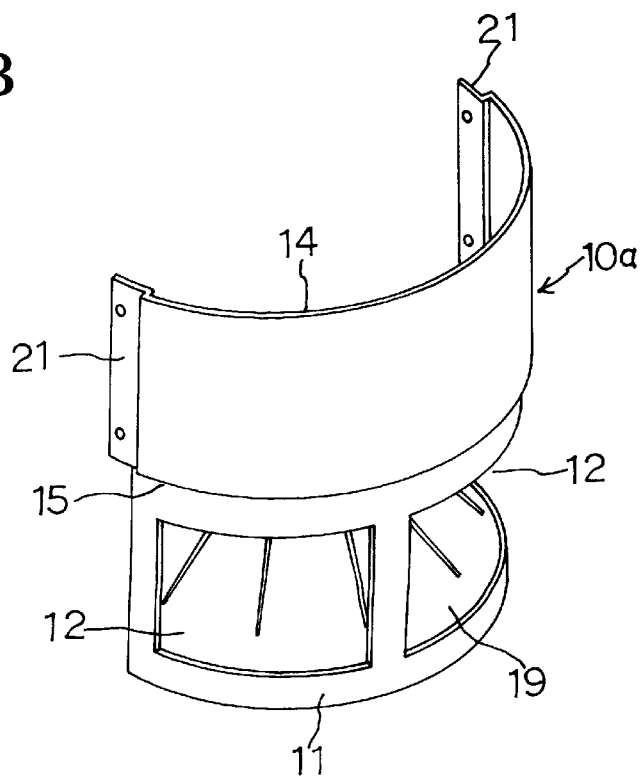
FIG. 1B is an explanatory view showing another piece of the penetrating member relating to this invention, in the state after having split the penetrating member into two pieces.

Referring to the drawings in particular, a preferred embodiment of the invention is shown in FIG. 1 through FIG. 8. FIG. 1A and FIG. 1B together show the entirety of fire retarding division-penetrating member which is divided into two pieces at its center. Numeral 10 and Numeral 10a are a pair of sleeve main bodies of semi-circular shape in the plane building up the penetrating member. These sleeve main bodies 10 and 10a are for the purpose of mounting the heat expansion fire resistant material of semi-circular shape forming the window 12. The structure forms at the lower portion the holding frame 11. This holding frame 11 has a shape conformed to the radius that can be accommodated inside the diameter of floor through-hole. The structure forms the perpendicular lateral side wall 14. The side wall 14 has a radius which is larger than the diameter of floor through-hole and the holding frame 11. The structure provides an engagement staged portion 15 in the boundary area of the perpendicular lateral side wall 14.

Numeral 16 is the heat expansion fire resistant material that is mounted to the lower inside of holding frame 11 of the sleeve main bodies 10 and 10a. The outside diameter side 16a is shown in the shape of its unfolded state of this heat expansion fire resistant material 16 in FIG. 4. The tongue 17 tapers toward the side of tip 17a and is formed to the inside diameter side 16b. The saw teeth state is shown where the notch 18 is symmetrical with respect to the tongue piece 17 and is present between these tongue pieces 17. Though the shapes of this tongue piece 17 and the notch 18 are punched out symmetrically from one sheet without any wastefulness, the tongue piece 17 and the notch 18 need not be symmetrical so long as the notch 18 is formed between the tongue pieces 17.

Figure 4:
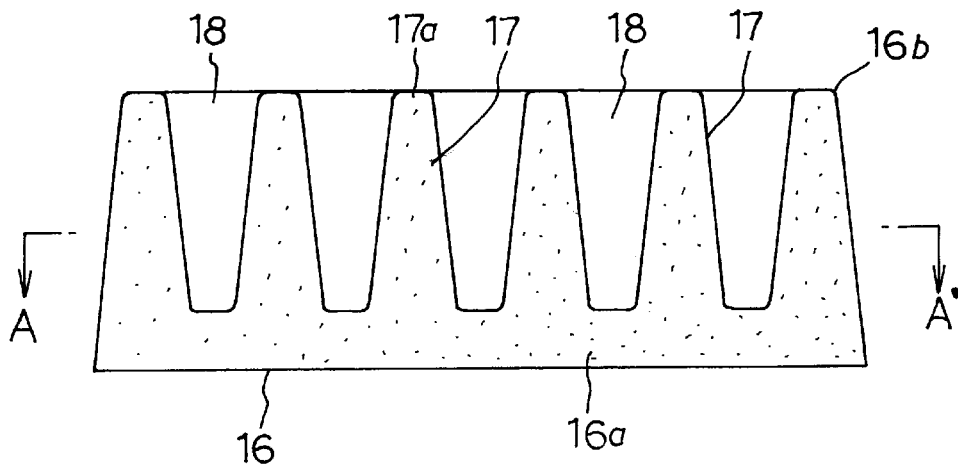
FIG. 4 is a development plan of heat expansion fire resistant material.
Figure 5:
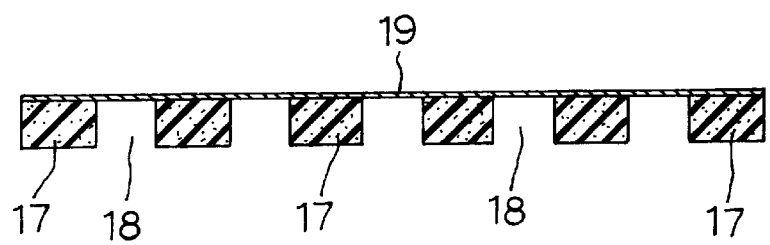
FIG. 5 is a sectional view taken along the line of A–A' of FIG. 4.

A sheet 19 is pasted fully or otherwise attached on one face of the heat expansion fire resistant material 16. This sheet 19 is for blocking the notch 18 on one face. Therefore, it may be acceptable to block the entirety of notch 18 with a single sheet 19 or to block the notches individually or in plural pieces. The sheet 19 is pasted up as shown in FIG. 4 and FIG. 5 with the heat expansion fire resistant material 16 being unfolded.

Figure 2:
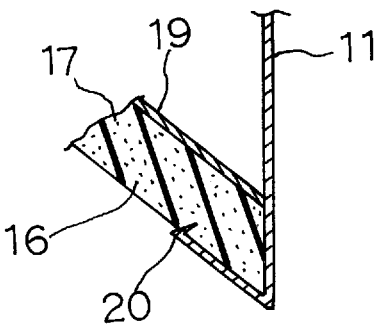
FIG. 2 is an explanatory sectional view showing the state where the heat expansion fire resistant material has been mounted to the holding frame using the claws.

The heat expansion fire resistant material 16 of the structure is in the state where its outside diameter side 16a is held by the claw 20 as shown in FIG. 2. In the lower inside of holding frame 11 of sleeve main bodies 10 and 10a as shown in FIG. 1(a), the tongue piece 17 is inclined upward toward the inside diameter side narrowing the notches 18 and approaching to them, with a hole formed at the center. The tips 17a of tongue piece 17 are butted to each other near the center. The sheet 19 is folded into the V-letter shape inside the notch 18.

The mounting of heat expansion fire resistant material 16 against the holding frame 11 may use a wire in addition to utilizing the claw 20, and this mounting means may be any method so long as the heat expansion fire resistant material 16 should get out of its place and fall down.

The connected portions 21 and 21a provide the connection when the sleeve main bodies 10 and 10a are opposed to each other and assembled to form a ring state. A step portion is provided on the side of one portion 21 by the thickness portion of lateral side wall 14. The step portion is locked with machine screws 22. However, this connection means may also be made using other methods and structural features.

Figure 3:
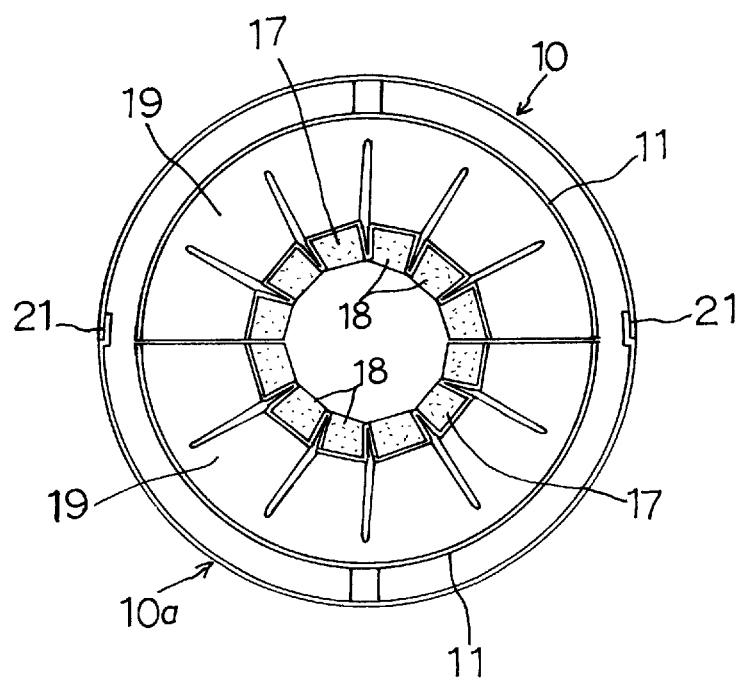
FIG. 3 is a plane view showing the status where the penetrating member has been assembled to form a circle.

FIG. 3 is a plane view in the status of connecting the sleeve main bodies 10 and 10a at the connected portions 21 and 21a. This occurs after placing the portions in opposed positions relative to each other.

Figure 6:
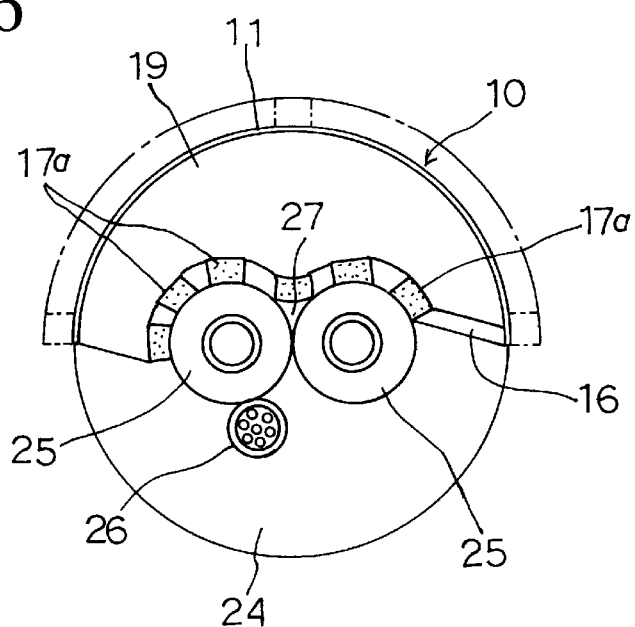
FIG. 6 is an explanatory view showing the state where the sleeve main body on one side has been installed (dropped) into the floor through-hole.
Figure 7:
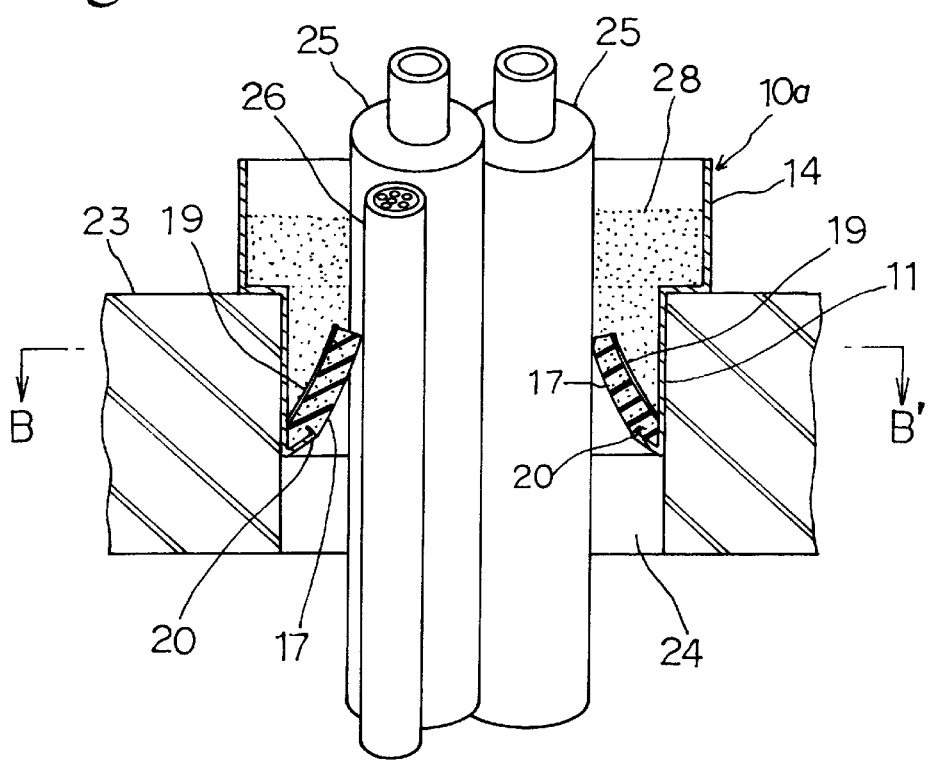
FIG. 7 is a sectional view showing the state where the sleeve main body has been dropped into the floor through-hole.
Figure 8:
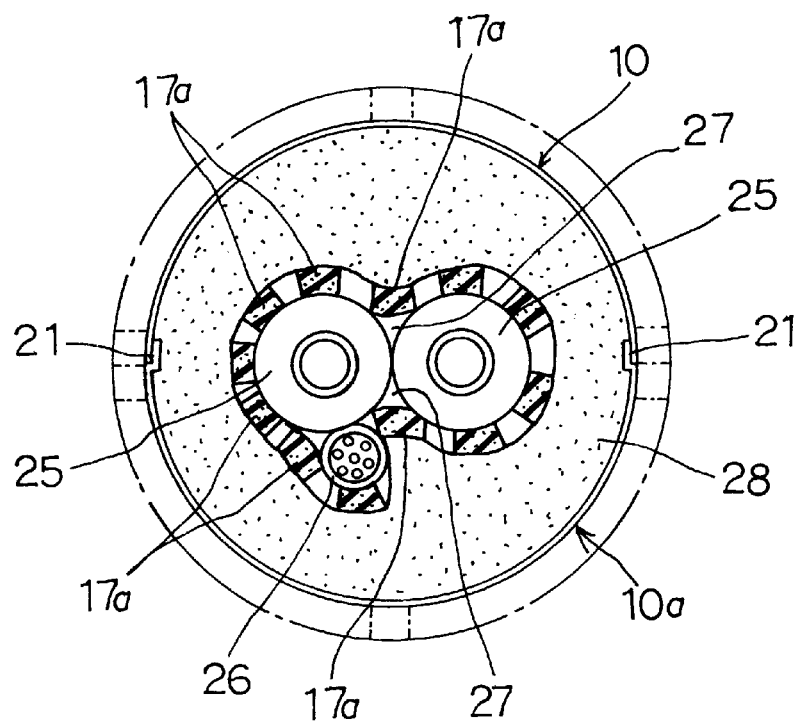
FIG. 8 is a sectional view taken along the line of B–B' of FIG. 7.

Next, the work execution example for conducting the fire retardant disposal with use of the penetrating member of the structure is expounded on with reference to FIG. 6 through FIG. 8.

First of all, the pipes 25 and the cables 26 are gathered together inside the floor through-hole 24 provided at the floor slab 23 as shown in FIG. 7. One side 10 of sleeve main bodies 10 and 10a split into two pieces shown in FIG. 1 is dropped until the engagement staged portion 15 engages with the brim of floor through-hole 24 from above inside the floor through-hole 24 as shown in FIG. 6. At this time the tip 17a of tongue piece 17 of heat expansion fire resistant material 16 comes into contact with the half outer circumferential face of pipe 25, and the tip 17a of partial tongue piece 17 enters into and gets in contact with the portion of valley 27 of pipe 25.

Then, the sleeve main body 10a on the other side is dropped down to the opposite side of floor through-hole 24 in a similar manner as the sleeve main body 10. FIG. 8 shows this state. The tip 17a of tongue piece 17 comes in contact with the outer circumferential face of pipe 25 and cable 26, and the valley 27, thus burying up the valley 27. Next, the mortar 28 shall be poured into the sleeve main bodies 10 and 10a up to the stipulated level from above, thus ending the disposal. FIG. 7 and FIG. 8 show this status.

If a fire disaster, etc. should happen at the upper floor or lower floor with the fire preventive disposal being provided with the method as mentioned above, the shielded material gets molten with this heat and the metal pipe and cable 26 alone are left over in case of the shielded metal pipe and cable 26, and at the same time the heat expansion fire resistant material 16 thermally gets swollen inside the floor through-hole 22a while closely adhering to the metal pipe and cable 26, and blocks the entirety of floor through-hole 24. As a result, the flames, heat, smokes, etc. are prevented from invading into the upper floor or lower floor via the floor through-hole 24.

Figure 9:
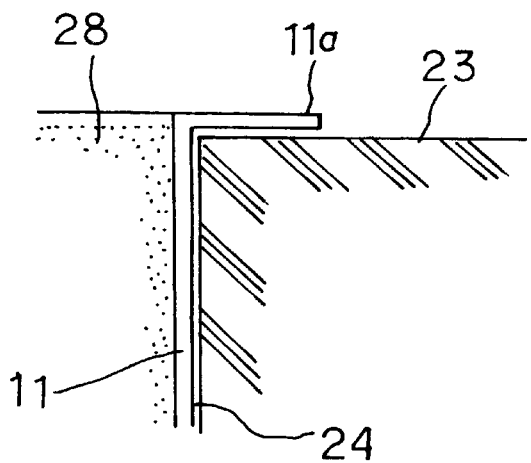
FIG. 9 is an explanatory view of an embodiment where the member has been engaged to the sleeve main body and the floor through-hole with use of the protrusive pieces.
Figure 10:
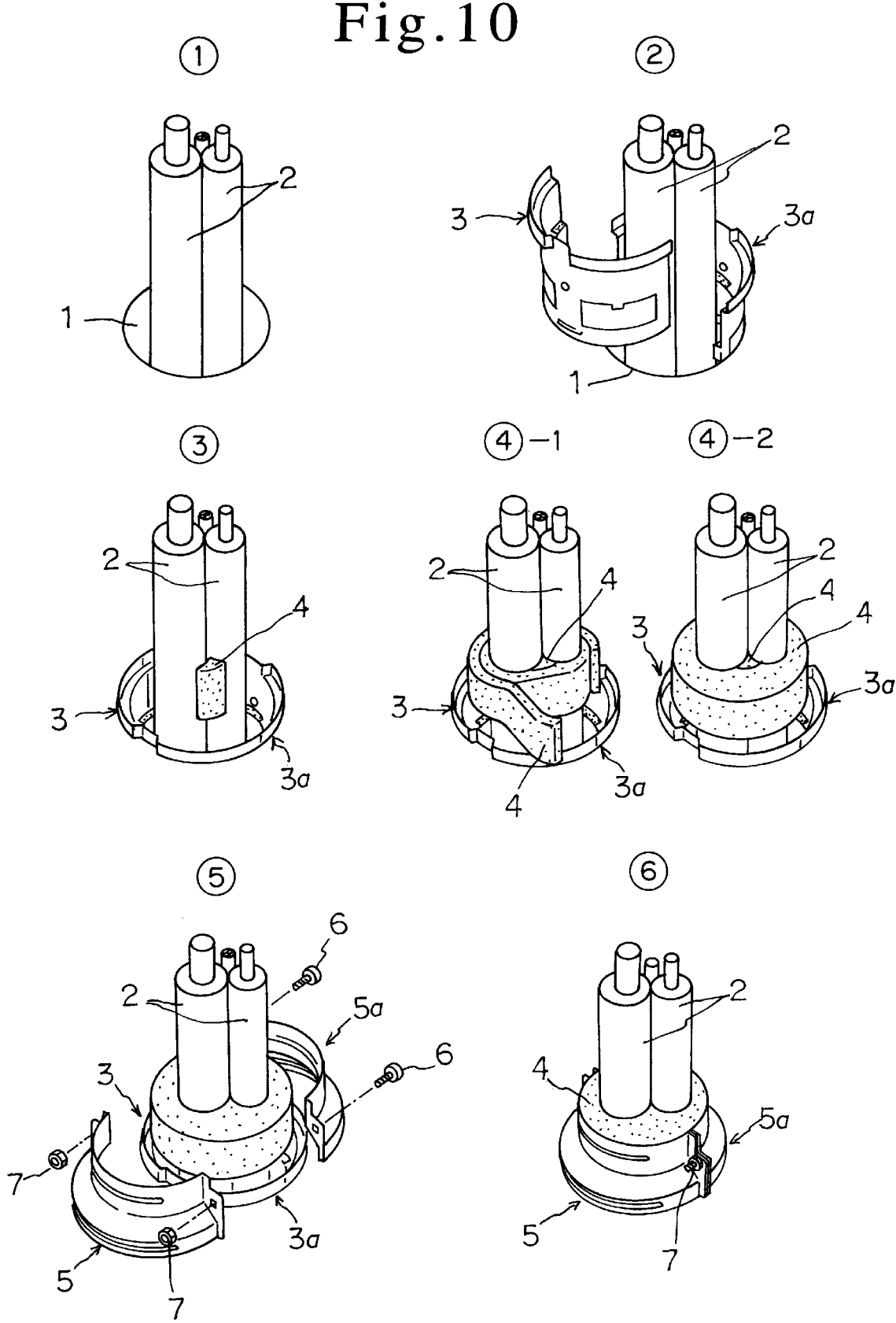
FIG. 10 is an explanatory view of the disposal example of conventional fireproof disposal kit.

Furthermore, in the present embodiment, the sleeve main bodies 10 and 10a are split into two pieces, but they may also be divided into three pieces. Moreover, because the staged portion 15 between the holding frame 11 and the lateral wall 14 are those to be engaged to the brim of floor through-hole 24, it may also be structured in such a manner that the upper brim of holding frame 11 is bent by 90° to the outside to form a protrusive brim 11a and that this protrusive brim 11a may get engaged with the brim of floor through-hole 24 shown by FIG. 9.

Because the embodiment of the present invention fits well to the pipes and the valley between the pipes by shaping the heat expansion fire resistant material into the saw teeth status, the filler such as the mortar, etc. won't drop down to the lower floor along the valley of pipe when the filler has been flown into the floor through-hole. Also, because pasting the sheet on the surface of heat expansion fire resistant material can securely block the notch in the interval of tongue piece, the filler won't drop down via the space between the notches.

Furthermore, the heat expansion fire resistant material in the present invention is shaped to the saw teeth state thereby is arranged in nice balance to the shape of inconstant piping periphery, can fully exhibit the performance of heat expansion fire resistant material and can block the floor through-hole during a fire disaster.

In addition, the heat expansion fire resistant material in this invention fits to the piping, etc. only with the sleeve main body being dropped into the floor through-hole by shaping the said heat expansion fire resistant material into the saw teeth state, so there is no need for conducting the repair and the like, and the work can be done with ease.

The penetrating member relating to the present invention can also be utilized to for wall through-holes and so forth in addition to the floor through-hole.

While specific embodiments of the invention have been shown and described in detail to illustrate the application of the principles of the invention, it will be understood that the invention may be embodied otherwise without departing from such principles.

What is claimed is:

1. A fire retarding division penetrating member comprising:

a sleeve main body formed of a plurality of pieces, said sleeve main body forming a heat expansion fire resistant holding frame with a window which is set to provide an outside diameter, to be accommodated inside a penetrating hole having a hole diameter, at a lower portion and also forming a larger diameter engagement staged portion, larger than the diameter of said penetrating hole, at an upper side of said holding frame; and heat expansion fire resistant material with an outside diameter side fixed to the heat expansion fire resistant material holding frame of said sleeve main body and with an inside diameter side having a saw tooth shape.

2. The fire retarding division-penetrating member according to claim 1, wherein a sheet is applied and fixed on an upper face of said heat expansion fire resistant material.

3. The fire retarding division-penetrating member according to claim 1, wherein said sleeve main body is divided into two pieces.

4. The fire retarding division-penetrating member according to claim 2, wherein said sleeve main body is divided into two pieces.

5. The fire retarding division-penetrating member according to claim 1, wherein said larger diameter engagement staged portion has engagement staged portion is shaped with a wall perpendicular to a wall defining the larger diameter.

6. The fire retarding division-penetrating member according to claim 1, wherein the engagement staged portion is shaped with the flange being extended in the horizontal direction.

* * * * *